United States Patent [19]
Mansour

[11] Patent Number: 5,133,297
[45] Date of Patent: Jul. 28, 1992

[54] PULSED ATMOSPHERIC FLUIDIZED BED COMBUSTOR APPARATUS AND PROCESS

[75] Inventor: Momtaz N. Mansour, Columbia, Md.

[73] Assignee: Manufacturing and Technology Conversion International, Inc., Columbia, Md.

[21] Appl. No.: 689,336

[22] Filed: Apr. 22, 1991

[51] Int. Cl.$^5$ .................. B09B 3/00; F22B 1/00
[52] U.S. Cl. .................. 122/4 D; 122/24; 431/1
[58] Field of Search .............. 122/4 D, 24; 431/1; 432/58

[56] References Cited

U.S. PATENT DOCUMENTS

| | | |
|---|---|---|
| 2,539,466 | 1/1951 | Parry . |
| 2,619,415 | 11/1952 | Hemminger . |
| 2,623,815 | 12/1952 | Roetheli et al. . |
| 2,680,065 | 6/1954 | Atwell . |
| 2,683,657 | 7/1954 | Garbo . |
| 2,937,500 | 5/1960 | Bodine, Jr. . |
| 2,979,390 | 4/1961 | Garbo . |
| 3,246,842 | 4/1966 | Huber . |
| 3,333,619 | 8/1967 | Denis . |
| 3,606,867 | 9/1971 | Briffa . |
| 3,966,634 | 6/1976 | Sacks . |
| 4,368,677 | 1/1983 | Kline ..................... 431/1 X |
| 4,529,377 | 7/1985 | Zinn et al. . |
| 4,655,146 | 4/1987 | Lemelson . |
| 4,682,985 | 7/1987 | Kohl . |
| 4,699,588 | 10/1987 | Zinn et al. . |
| 4,708,159 | 11/1987 | Lockwood, Jr. . |
| 4,773,918 | 9/1988 | Kohl . |
| 4,909,731 | 3/1990 | Zinn et al. ..................... 432/58 |
| 4,951,613 | 8/1990 | Harandi et al. . |

FOREIGN PATENT DOCUMENTS

| | | |
|---|---|---|
| 2301633 | 9/1976 | France . |
| 8200047 | 1/1982 | PCT Int'l Appl. . |
| 644013 | 10/1950 | United Kingdom . |
| 665723 | 1/1952 | United Kingdom . |

*Primary Examiner*—Edward G. Favors
*Attorney, Agent, or Firm*—Dority & Manning

[57] ABSTRACT

A pulsed atmospheric fluidized bed reactor system is disclosed and claimed along with a process for utilization of same for the combustion of, e.g. high sulfur content coal. The system affords a economical, ecologically acceptable alternative to oil and gas fired combustors. The apparatus may also be employed for endothermic reaction, combustion of waste products, e.g. organic and medical waste, drying, calcining and the like.

16 Claims, 2 Drawing Sheets

PULSED ATMOSPHERIC FLUIDIZED BED COMBUSTOR APPARATUS AND PROCESS

FIELD OF THE INVENTION

The present invention relates to apparatus and process for pulsed fluidized bed reactor for combustion of solid fuels and other operations in an efficient, environmentally acceptable, and economical manner.

BACKGROUND OF THE INVENTION

Many technologies have been developed and/or demonstrated for utilizing high-sulfur fuels in general and coals in particular. From a performance, emissions, and economics standpoint, fluidized bed combustion technology has emerged as a leading candidate for utilizing high sulfur fuels. Many fluidized bed combustion designs are available and are at various stages of commercialization. Such systems can be classified in terms of operating pressure (atmospheric or pressurized) and fluidization mode (bubbling or circulating). All the fluidized bed designs possess attributes such as in-situ sulfur capture, no slagging or fouling of heat transfer surfaces, high heat transfer rates to heat exchange surfaces, near uniform temperature in combustion zone, and fuel flexibility. These features have made it possible for fluidized bed combustion technology to compete successfully for the large industrial boiler market (6.3–37.8 kg/s or 50,000–300,000 lb/hr steam). Large-scale (70 to 150 $MW_e$) field demonstration projects are in progress to facilitate commercialization in the utility sector. The potential of fluidized bed combustion technology, and specifically, atmospheric fluidized bed combustion for small-scale (<6.3 kg/s or 50,000 lb/hr steam equivalent) applications have, however, not been explored seriously until recently.

Atmospheric fluidized bed combustion technology appears to have a great potential for oil and gas replacement in small-scale installations of less than 6.3 kg/s (50,000 lb/hr) steam equivalent. These smaller units can meet the needs of process heat, hot water, steam, and space heating in the residential, commercial, and industrial sectors. Currently, oil and natural gas-fired equipment are being used almost exclusively for these applications. Due to the large difference between the prices of these fuels and coal, coal-fueled atmospheric fluidized bed combustion technology engineered for small-scale applications has the potential of becoming very competitive under economic conditions in which the price differential overcomes the initial capital cost of the coal-based system. A successful coal-fueled system can not, however, only be more economical, but can also reduce the nations's dependence on foreign oil and open up new markets for domestic coal and the coal-fueled fluid-bed technologies.

Market analysis indicates that a coal-based system that provides competitive levels of capital and operation and maintenance costs, performance, and reliability at the 0.126 to 1.26 kg/s (1,000 to 10,000 lb/hr) steam generation rate can displace as much as 2.64 EJ (2.5 quad Btu) of gas and oil within the residential, commercial, and light industrial sectors. In the industrial sector, systems from 1.26 to 6.3 kg/s (10,000 to 50,000 lb/hr) steam can displace another 1.16 EJ (1.1 quad Btu) of energy per year.

As pointed out earlier, the atmospheric fluidized bed combustion systems can be classified into bubbling-bed and circulating bed systems. In a coal-fueled bubbling-bed system, it is critical to control the extent of fines (elutriable particles) in the coal and sorbent feed in order to limit particle carryover and its adverse effect on combustion and sulfur capture performance, emissions, and the size of solids collection equipment. Additionally, the higher Ca/S feed ratios typically required in bubbling fluidized combustion applications tend to increase sorbent and waste disposal costs, and turndown capability is rather limited. As regards a circulating fluidized bed combustion system, it exhibits higher combustion efficiency and sorbent utilization, lower $NO_x$ emissions due to multiple air staging, and greater fuel flexibility and turndown as compared to a bubbling type system. However, the circulating type system requires a tall combustor to accommodate sufficient heat exchange surface. Such makes it both impractical and expensive to scale-down circulating fluidized bed combustors to sizes significantly smaller than 12.6 kg/s (100,000 lb/hr) steam equivalent.

Fluid bed systems in general tend to have large thermal inertia. Start-up for large fluid bed systems requires a considerable amount of time and also auxiliary subsystems to preheat the beds in a controlled manner. Both add to overall system cost and complexity. Concepts which provide a simple compact design for fast start-up with low-cost hardware and also have simple operational characteristics are a must for small-scale applications. Thermal inertia of fluid bed systems also affects load following to some extent and this has also been a serious shortcoming for scale-down to small end-use applications. System designs must provide fast response to load changes, particularly through auxiliary firing subsystems and methods of bed heating. Such designs should not require additional hardware and control systems if the system capital cost is to be maintained sufficiently low to compete favorably with existing oil and gas equipment. In addition, new designs capable of higher throughput for given combustor size will contribute to a reduction in capital cost per kJ/hr (Btu/hr) of fuel fired. This must be achieved, however, without compromising the pollution control performance of equipment intended to meet stringent requirements in some of these end-use applications.

Simply scaling-down existing large atmospheric fluidized bed combustion systems to a size range suitable for small end-use sectors of interest will result in complex and expensive systems that will not be competitive with presently available oil and gas-fired equipment. New innovative approaches are needed to reduce cost and enhance performance.

Such a new system should therefore possess a number of attributes, such as high combustion efficiency; high sulfur capture capacity; low $NO_x$ emissions; and should be capable of rapid start-up with load-following capability. Also such systems, as with most systems should be of a simple design with inexpensive, easily managed controls to afford a reliable, safe system. Last, but not least, the system should be at least technologically and economically equivalent to oil- and gas-fired packaged systems.

The apparatus and process according to the present invention overcome the above noted problems of the prior art and possess the attributes set forth above.

SUMMARY OF THE INVENTION

It is thus an object of the present invention to provide an improved combustor.

Another object of the present invention is to provide an improved combustor that operates on high sulfur fuels such as coals while avoiding unwanted emmissions.

Still another object according to the present invention is to provide an improved fluidized bed combustor.

Yet another object according to the present invention is to provide a pulsed fluidized bed combustor capable of economical operation with high sulfur fuels.

Another object of the present invention is to provide a pulsed atmospheric fluidized bed reactor.

Still another object according to the present invention is to provide a pulsed fluidized bed combustor that may be down-sized to economically operate at 50,000 pounds per hour stress equivalent or less.

Another object according to the present invention is to provide an improved process for the combustion of high sulfur fuels.

It is still further another object according to the present invention to provide an improved process for combusting solid fuels in a fluidized bed environment.

Generally speaking, apparatus according to the present invention includes a reactor vessel; means for feeding a fluidizable solid material into said vessel intermediate the height of same; means for supplying a fluidizing medium for said solid material into said vessel below said solid material entrance to said vessel to establish a fluidized bed of solid material therebetween; a pulse combustor unit extending into said vessel, said pulse combustor unit comprising a combustion chamber, valve means associated with said combustion chamber for admitting a fuel-air mixture thereto, a resonance chamber in communication with said combustion chamber and extending outwardly therefrom, an outer free end of said resonance chamber being located with respect to said fluidized bed to permit gaseous products from said resonance chamber to act thereon; heat transfer means located in said vessel with respect to said fluidized bed to withdraw heat therefrom; and flue gas exhaust means in communication with said vessel to exhaust products of combustion therefrom.

Generally speaking, the process according to the present invention includes the steps of establishing and maintaining a fluidized bed of solid fuel within a vessel therefor and about a heat transfer means; pulse combusting a fuel-air mixture in a fashion to create a pulsation flow of combustion products and an acoustic wave therefrom; directing said pulsating flow of combustion products to act directly on said fluidized bed of solid fuel for combustion of said solid fuel; circulating a heat transfer medium through said heat transfer means to receive heat therefrom for predetermined treatment of said medium; and exhausting products of combustion from said vessel after separation of entrained solids therefrom.

BRIEF DESCRIPTION OF THE FIGURES

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF THE PREFERRED EMBODIMENTS

Figure 1:
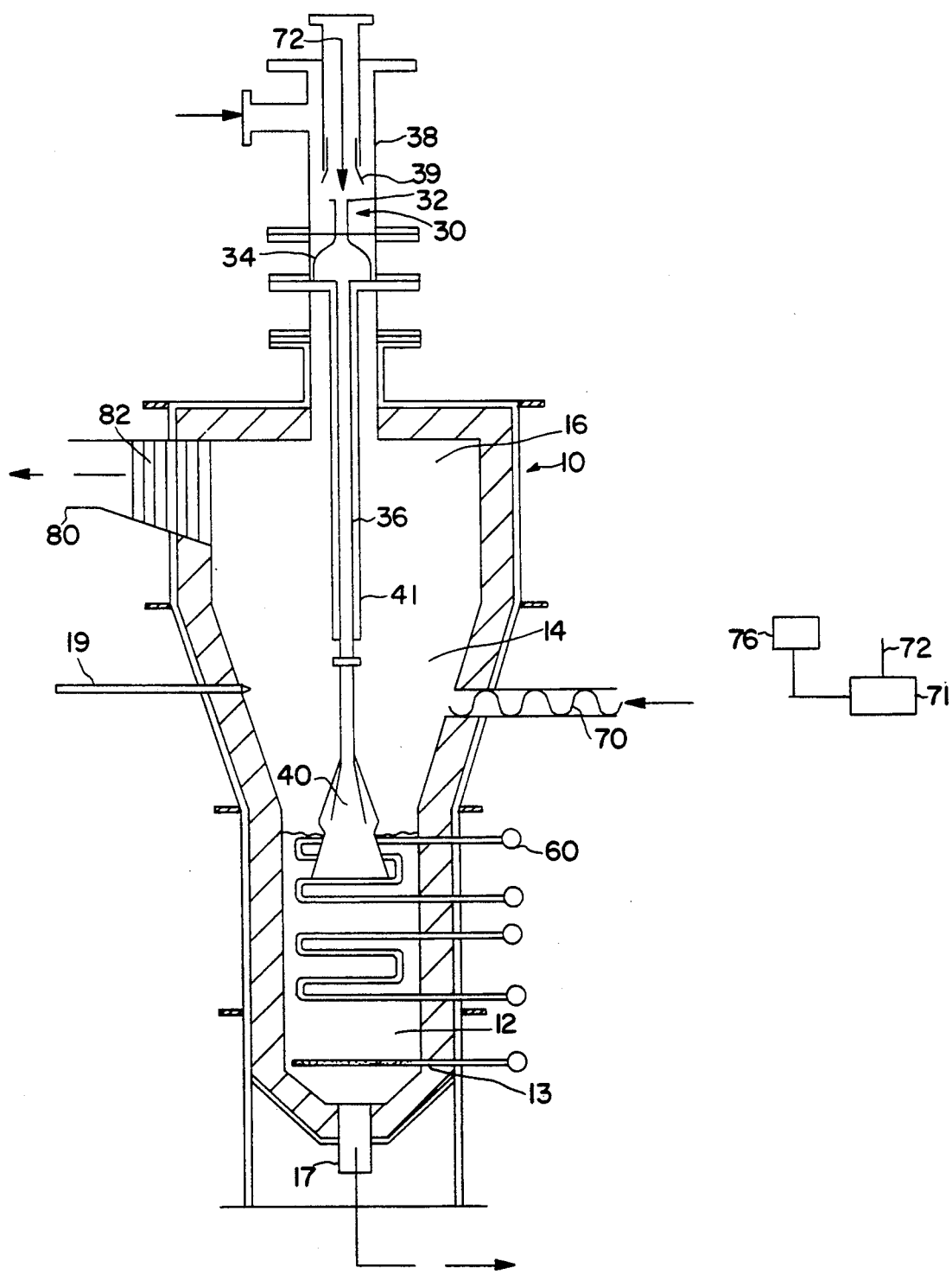
FIG. 1 is a schematic illustration of a pulsed atmospheric fluidized bed reactor according to teachings of the present invention.

The preferred system according to the present invention integrates a pulse combustor with an atmospheric bubbling-bed type fluidized bed combustor as illustrated in FIG. 1. In this modular configuration, the pulse combustor burns the fuel fines which are less than 30 seive or 600 microns and the fluidized bed combusts the coarse solid fuel particles.

As shown in FIG. 1, the pulsed atmospheric fluidized bed apparatus according to the present invention includes a refractory-lined vessel generally 10 in which the fluidized bed will be produced. A pulse combustor generally 30 is integrated with vessel 10 to afford the advantages set forth herein.

Vessel 10 includes a lower section 12, an intermediate section 14, and an upper section 16. Located in lower section 12 of vessel 10 is a fluid distribution means 13 through which fluid may be introduced adequate in velocity to fluidize solids located in lower section 12. Generally speaking, it has been found that fluid velocities in a range of from about 4 to about 13 feet per second are adequate for fluidization. Also located within lower section 12 where the dense fluidized bed will be formed are a plurality of tubes or conduits 60 through which a heat exchange medium may be passed to remove heat from the fluidized bed. Typically, air or water would be circulated through heat exchange tubes 60 to produce heated air, hot water or steam though other materials may be passed therethrough for an intended result.

Intermediate vessel section 14 flares outwardly and connects lower section 12 with upper section 16, with intermediate section 14 and upper section 16 forming what is referred to as the freeboard area of a fluidized bed system, in which gas velocity decreases, gas residence time increases and elutriation decreases. Conversely, the dense fluidized bed in lower vessel section 12 operates in a bubbling, turbulent mode.

Pulse combustor 30 includes valve means 32 which may be an aerodynamic valve or fluidic diode, a mechanical valve or the like, a combustion chamber 34 and a tailpipe 36. Additionally, pulse combustor 30 includes an air plenum 38 and a thrust augmentor 39. Tailpipe or resonator tube 36 may be a single tube as shown or a plurality of tubes and in a preferred embodiment has a diffuser section 40 located at a free end of same. Likewise in a preferred embodiment tailpipe 36 has a water jacket 41 surrounding at least a portion of the length of same.

Diffuser section 40 at the end of tailpipe 36 forms an expansion section which reduces the gas exit velocity from tailpipe 36 and prevents channeling in the fluidized bed. After the flue gas from the pulse combustor 30 exits the tailpipe 36 therefore, it enters the diffuser section 40 which provides fines recirculation and increased particle residence time in the bed. Vessel 10 also includes an overbed coarse fuel and sorbent feed system 70, preferably a screw conveyor, and a fuel classifier 71 for separating fuel feed into coarse fraction and fines.

Fines are fed from classifier 71 via line 72 to pulse combustor 30 while the coarse fuel component is fed from classifier 71 to feed system 70. Sorbent such as crushed limestone is fed from a supply hopper 76 to feed system 70 for introduction to vessel 10 while the fuel sorbent mixture may vary, sorbent content is preferably maintained at a level of two to three times the sulfur ratio of the solid fuel, e.g. coal.

Vessel 10 further includes a product gas exit conduit 80 having a gas solids separator 82, preferably an inertial separator at the entrance thereof to separate elutriated fines from the exit gas stream and return same to freeboard section 16. Waste rock, ash and the like are discarded from vessel 10 through port 17 located at a lower end of same. A burner 19 is also provided for vessel 10, preferably fired by natural gas to be employed for operational safety and start-up of the system.

A pulse combustor typically includes a flow diode, a combustion chamber and a resonance tube. Fuel and air enter the combustion chamber. An ignition source detonates the explosive mixture in the combustion chamber during start-up. The sudden increase in volume, triggered by the rapid increase in temperature and evolution of combustion products, pressurizes the chamber. As the hot gas expands, the valve, preferably a fluidic diode, permits preferential flow in the direction of the resonance tube. Gases exiting the combustion chamber and the resonance tube possess significant momentum. A vacuum is created in the combustion chamber due to the inertia of the gases within the resonance tube. The inertia of the gases in the resonance tube permits only a small fraction of exhaust gases to return to the combustion chamber, with the balance of the gas exiting the resonance tube. Since the chamber pressure is below atmospheric pressure, air and fuel are drawn into the chamber where autoignition takes place. Again, the valve constrains reverse flow, and the cycle begins anew. Once the first cycle is initiated, engine operation is thereafter self-sustaining.

The flow diode utilized in many other pulse combustion concepts is a mechanical "flapper valve." The flapper valve is actually a check valve permitting flow from inlet to chamber, and constraining reverse flow by a mechanical seating arrangement. This served quite well for the purpose intended. While such a mechanical valve may be used in conjunction with the present system, an aerodynamic valve without moving parts is preferred. With an aerodynamic valve, during the exhaust stroke, a boundary layer builds in the valve, and turbulent eddies choke off much of the reverse flow. Moreover, the exhaust gases are of a much higher temperature than the inlet gases. Therefore, the viscosity of the gas is is much higher and the reverse resistance of the inlet diameter, in turn, is much higher than that for forward flow through the same opening. These phenomena, along with the high inertia of the exhuasting gases in the resonance tube, combine to yield preferential and mean flow from inlet to exhaust. Thus, the preferred pulse combustor is a self-aspirating engine, drawing its own air and fuel into the combustion chamber and auto-ejecting combustion products.

Rapid pressure oscillations in the combustion chamber generate an intense oscillating flow field. In the case of coal combustion, the fluctuating flow field causes the products of combustion to be swept away from the reacting solid thus providing access to oxygen with little or no diffusion limitation. Second, pulse combustors experience very high mass transfer and heat transfer rates within the combustion zone. While these combustors tend to have very high heat release rate (typically 10 times those of conventional burners), the vigorous mass transfer and high heat transfer within the combustion region result in a more uniform temperature Thus, peak temperatures attained are much lower than in the case of conventional systems. This results in a significant reduction in nitrogen oxide ($NO_x$) formation. The high heat release rates also result in a smaller combustor size for a given firing rate and a reduction in the residence time required.

Performance of atmospheric fluidized bed combustors is affected by the rate of combustion of coal, which in turn is affected by coal properties (devolatilization, swelling, fragmentation, and char combustion), feed particle size range, feed system and combustion-enhanced mechanic attrition, heat and mass transfer rates, and unit operating conditions. Furthermore, for such systems the carbon carryover into the primary particle separator is generally high due to limited residence time of fuel fines in the combustor. To achieve high carbon utilization efficiency, recycling of fines to the bed has been often practiced. These recycle processes add to system complexity and cost and at times are prone to plugging. According to the present invention, higher combustion efficiency can be attained because the fuel fines are burned in the pulse combustor and only the coarse coal which has been classified is burned in the fluid bed.

The three "Ts" of combustion, namely, 1) temperature, 2) turbulence, and 3) residence time for the pulse combustor and the bubbling fluid-bed freeboard are quite different, as shown below.

|  | Pulse Combustor | Atmospheric Fluidized Bed Freeboard Zone |
|---|---|---|
| Temperature | >1092° C. or 2000° F. (High) | 843° C. or 1550° F. (Low) |
| Turbulence | Very High (Oscillatory) | Moderate (Plug f with back mixing) |
| Gas Residence Time | 10 to 100 milliseconds | 2 to 3 seconds |

Since the present invention employs both a pulse combustor and an atmospheric fluidized bed combustor, it can handle the full-size range of coarse and fines. The oscillating flow field in the pulse combustor provides for high interphase and intraparticle mass transfer rates. Therefore, the fuel fines essentially burn under kinetic control. Due to the reasonabily high temperature (>1093° C. but less than the temperature for ash fusion to prevent slagging), combustion of fuel fines is substantially complete at the exit of the pulse combustor. The additional residence time of 1 to 2 seconds in the freeboard zone of the fluidized bed unit ensures high carbon conversion and, in turn, high combustion efficiency.

Devolatilization and combustion of fuel fines in the pulse combustor also enable the release of a significant portion of sulfur by the time the fuel fines leave the tailpipe or resonance zone. This sulfur has a high probability of capture in the dense fluid bed due to the pulse combustor effluxing into the fluid bed. The acoustic field radiated into the fluid bed enhances the mass transfer rate and in turn increases the reaction rate between the sorbent and $SO_2$. Acoustic enhancement in the fluid bed mass transfer process, and the fines recirculation as a consequence of the draft tube design help achieve high sulfur capture efficiency at low Ca/S molar feed ratio, which leads to lower limestone and waste disposal costs.

Pulse combustors are inherently low NO$_x$ devices. The rate of heat transfer in the pulsating flow is higher than that in conventional steady flow and helps create lower overall temperature in the combustion chamber. Also, the high rates of mixing between the hot combustion products and the colder residual products from the previous cycle and the incoming cold reactants create a short residence time at high temperature quenching the NO$_x$ production. These complementary mechanisms create an environment which approximates a well-stirred tank at relative low temperature and result in low NO$_x$ production. The dense fluid bed in the lower section 12 of vessel 10, due to operation at low temperature and with coarse fuel particles, enjoys a lower NO$_x$ production as well. Consequently, the NO$_x$ emissions from systems of the present invention are believed to be lower than that of conventional fluid bed combustors.

The overall heat transfer coefficient in the water-jacketed pulse combustor tailpipe is of the same order as that for tubes immersed in the dense fluidized bed. The replacement of the inefficient heat exchanger in the freeboard zone of a conventional bubbling fluidized bed combustor by the water-jacketed pulse combustor tailpipe significantly decreases the heat transfer surface area requirement and cost.

Figure 2:
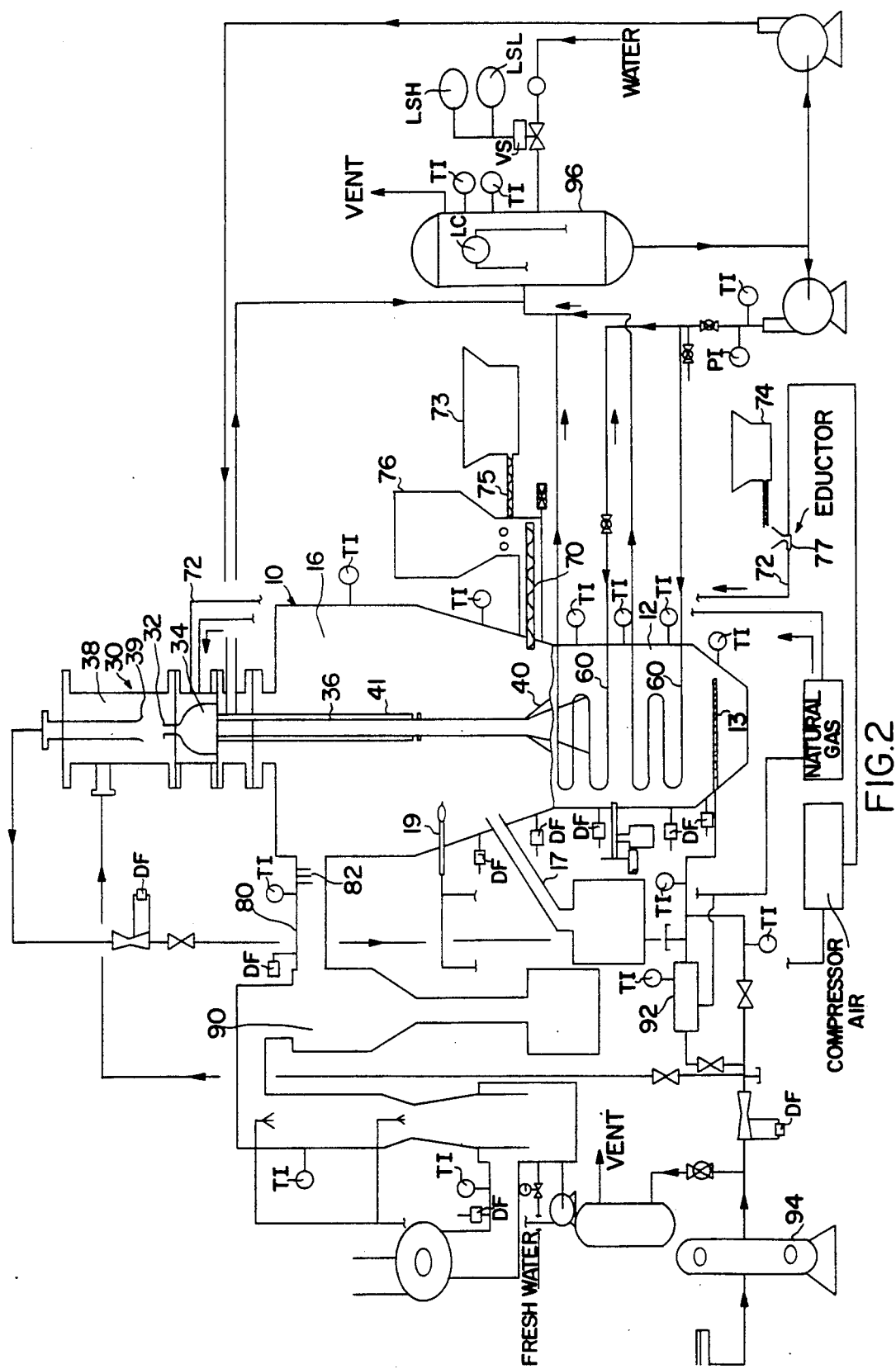
FIG. 2 is a schematic illustration of the pulsed atmospheric fluidized bed reactor of FIG. 1 in a coal fuel combustion environment.

In order to establish the technical merit of the technology according to the present invention, a laboratory-scale system (1.58GJ/hr—1.5 MMBtu/hr—coal firing rate) was designed, built and tested. A schematic of the unit is shown in FIG. 2. The primary objective of this work was to investigate the integration of a pulse combustor with the fluidized bed portion of a furnace. A convective section was not included since the additional expense was considered unjustified. Therefore, the steam output and the thermal efficiency of the unit tested are somewhat lower than those expected in normal practice.

In FIG. 2, the apparatus as described with respect to FIG. 1 is illustrated with like members assigned, in conjunction with related process equipment. After classification of solids, e.g. coal, into fines and coarse particles (not shown), the coarse particles are maintained in coal bin 73 from which the particles are fed by a conveyor 75 into a sorbent feed bin 76 where sorbent is fed into the coal supply as noted hereinbefore. The coal-sorbent mixture is then fed to vessel 10 by feed conveyor 70 and falls onto the dense bed located in lower section 12 of vessel 10 which is being maintained in a bubbling fluidized state by fluid entering therebeneath through fluid distributor means 13.

Fines separated from the coal are stored in a bin 74 therefor and are fed to an eductor where they are transported via line 72 to pulse combustor 30. Assuming that pulse combustor is in an operational state, aerodynamic valve 32 pulls in an air-feed mixture on demand. As shown in FIG. 2, natural gas is also fed to pulse cobustor valve 32 where it also serves as fuel. Products of combustion from pulse combustor 30 then proceed with an oscillating acoustic pressure wave through resonance tube or tailpipe 36, through diffuser section 40 and into the fluidized bed. Generally speaking, heat release rate in pulse combustor 30 is in a range of from about 2 to about 6 MM Btu/hr/ft.$^3$; with product gas temperature in a range of from about 1400° to about 3500° F. Gas velocity in the resonance tube is in a range of from about 150 to about 1600 feet per second with velocity oscillation in a range of from about 20 to about 150 Hertz.

In the vessel, acoustic pressure wave level in a range of from about 100 to about 185 dB are achievable. Likewise temperatures are achievable in the vessel 10 up to about 2000° F. based on volumetric heat releases from the pulse combustor in a range of from about 100,000 to about 200,000 Btu/hr/cu.ft. Temperatures in the freeboard zone 14, 16 of vessel 10 may then exceed 2000° F., and are capable of destruction of organic materials. In the fluidized bed, temperatures in a range of from about 1500° to about 1700° F. are desired to minimize nitrogen oxides.

The acoustic wave exiting diffuser 40 and impacting in the fluidized bed brings about enhanced mixing and heat transfer. The solid fuel in fluidized state is combusted while temperatures in the bed may be controlled by heat transfer medium passing through tubes 60 submerged in the fluidized bed. Obviously heat transfer from the bed to the medium may be used to both control the overall temperature of the fluidized bed and/or to create a desired resultant effect on the medium, i.e. to heat water or air, to produce steam or the like.

Products of combustion then rise above the fluidized bed into the freeboard zone, where further heat transfer or reaction may take place, and from the freeboard zone through entrained solids separator 82 and out the flue gas exit 80 to cyclone 90. Since the fuel has been classified, minimal fines are elutriated into the freeboard zone, thus again lessening the release of sulfur.

Also in the overall scheme of operation, the fluidizing medium, e.g. air or steam may be preheated in preheater 92. Fluidizing medium is supplied to preheater 92 by a primary air blower 94 and/or return of excess air or other fluid from pulse combustor 30. Likewise as illustrated, steam generated in tubes 60 passes therefrom to a steam drum 96 and from drum 96 as desired.

In a high sulfur coal burning process, limestone and coarse, classified coal are fed onto the fluidized bed within vessel 10 while the fines are fed, as noted above, to pulse combustor 30 as a fuel source. Sulfur in the fines is basically removed in the pulse combustor and is picked up by the limestone in the fluidized bed. Likewise sulfur in the coarse coal is captured by limestone in the bed in a more efficient manner than in prior art systems. To accomplish such, temperatures in the fluidized bed are preferably maintained in a range of from about 1400° to about 1750° F. Likewise in this temperature range less nitrogen oxide byproducts are produced.

A total of 28 tests were performed on apparatus as shown in FIG. 2, including shakedown and characterizations tests. The unit was tested both with and without the pulse combustor, and test parameters are given in Table 1. The system was on-line for more than 200 hours and combusted nearly 9 tons of coal. N$_2$O emissions measurements were made in collaboration with Drs. L. J. Muzio and G. Shiomoto of Fossil Energy Research Corporation, Laguna Hills, Calif.

TABLE 1

| Test Parameters | |
|---|---|
| Coal Type: | Pittsburgh No. 8, W. Kentucky Nos. 9 and 11 |
| Coal Size Distribution: | 9.5 mm (⅜") by 0 with 15–40% fines by wt. |
| Limestone: | Shasta |
| Limestone Size Distribution: | 3.2 mm (⅛") by 0 |
| Superficial Gas velocity: | 1.52–2.13 m/s (5–7 ft/s) |
| Bed Temperature: | 815–871° C. (1500– |

TABLE 1-continued

| Test Parameters | |
|---|---|
| | 1600° F.) |
| Ca/S Ratio: | 2.5-2.7 |
| Bed Area: | 0.61 m × 0.61 m (2' × 2') |
| Furnace Height: | 3.05 m (10') |
| Pulse Combustor Fuel: | Coal, Gas |

A summary comparison of the performance and emissions data from the 0.61 m×0.61 m (2'×2') facility according to the present invention with those from conventional bubbling fluidized bed combustors (taller freeboard and recycle operation) and circulating fluidized bed combustor units is given in Table 2. The comparison is for typical high-volatile bituminous coals and sorbents of average reactivity. The values indicated for the prior art fluidized bed combustors are based on published information. It is seen that the system according to the present invention exhibits superior performance in relation to the prior art. The higher combustion efficiency translates into reduced coal consumption and lower system operating cost; the improvement in sulfur capture implies less sorbent requirement and waste generation and in turn lower operation cost; lower $NO_x$ and CO emissions mean ease of siting; and greater steam-generation rate translates into less heat exchange surface area and reduced capital cost. Also, it seems that $N_2O$ emissions from fluidized bed technology are not insignificant but are comparable to published data on $NO_x$ emissions. The mode of operation does not have much influence on $N_2O$ emissions. In summary, the present system performance generally (i) surpasses those of the conventional systems, (ii) is comparable to circulating fluidized bed combustion in combustion and $N_2O$ emissions, and (iii) is better than circulating fluidized bed combustors in sulfur capture and CO and $NO_x$ emissions.

TABLE 2

Performance Characteristics of Fluidized Bed Combustors

| | ATM | Pulsed ATM | Bubbling* | Circulating* |
|---|---|---|---|---|
| Combustion Efficiency % | 89-93 | 92-97 | 90-97 | 93-99 |
| $SO_2$ Capture Effic. (%) | 70-85 | 90-98 | 70-85 | 75-95 |
| $NO_x$ Emissions (ppmv)+ | 155-620 | 110-265 | 400-500 | 100-300 |
| $N_2O$ Emissions (ppmv)+ | 70-100 | 70-100 | 10-220 | 10-220 |
| CO Emissions (ppmv)+ | 400-1600 | 180-800 | 400-1200 | 500-1500 |
| Steam Rate kg/s (lb/hr) | 227-317 (500-700) | 363-372 (800-820) | | |

| Test Parameters | |
|---|---|
| Bed Temperature | 815-871° C. (1500-1600° F.) |
| Ca/S Ratio | 2.5-2.7 |
| Coal | Bituminous (high volatile) |

*Based on literature data

These factors indicate the present invention to be an attractive option at any scale. The fact that it is impractical and expensive to scale-down a circulating fluidized bed combustor to the 0.126 to 6.3 kg/s (1,000 to 50,000 lb/hr) steam equavalent range as noted above.

Apparatus as described heretofore has been directed primarily to a system for combusting high sulfur content coal. Such apparatus, particularly as described with respect to FIG. 1, can also be employed for improved combustion of other products such as by way of example, biomass, waste products exemplified by medical waste, industrial waste, organics and the like, for endothermic reactions, drying, calcining and the like.

It will be understood, of course, that while the form of the invention herein shown and described constitutes a preferred embodiment of the invention, it is not intended to illustrate all possible form of the invention. It will also be understood that the words used are words of description rather than of limitation and that various changes may be made without departing from the spirit and scope of the invention herein described.

What is claimed is:

1. A pulsed fluidized bed reactor comprising:
   a) a reactor vessel;
   b) means for feeding a fluidizable solid material into said vessel intermediate the height of same;
   c) means for supplying a fluidizing medium for said solid material into said vessel below said solid material entrance to said vessel to establish a fluidized bed of solid material therebetween;
   d) a pulse combustor unit extending into said vessel, said pulse combustor unit comprising a combustion chamber, valve means associated with said combustion chamber for admitting a fuel-air mixture thereto, a resonance chamber in communication with said combustion chamber and extending outwardly therefrom, an outer free end of said resonance chamber being located with respect to said fluidized bed to permit gaseous products from said resonance chamber to act thereon;
   e) heat transfer means located in said vessel with respect to said fluidized bed to withdraw heat therefrom; and
   f) flue gas exhaust means in communication with said vessel to exhaust products of combustion therefrom.

2. Apparatus as defined in claim 1 comprising further means located at a free end of said resonance chamber to diffuse gaseous output therefrom.

3. Apparatus as defined in claim 2 wherein said diffuser means is located within said vessel where said fluidized bed will be maintained.

4. Apparatus as defined in claim 1 comprising further a solids classifier, said solids classifier separating said solids into coarse solids and fines, said coarse solids being fed to said vessel by said feeding means, and means for supplying said fines to said pulse combustor.

5. Apparatus as defined in claim 1 where said resonance chamber of said pulse combustor is at least one elongated pipe.

6. Apparatus as defined in claim 5 wherein said at least one elongated pipe has a water jacket about at least a portion of the length of same.

7. Apparatus as defined in claim 1 wherein said vessel comprises a lower section where said fluidized bed will be maintained and an expanded upper section.

8. Apparatus as defined in claim 1 wherein said flue gas exhaust means includes an inertial entrained solids separator.

9. Apparatus as defined in claim 1 wherein said heat transfer means is a conduit located within said vessel where said fluidized bed will be located, said conduit being adapted to transport a heat transfer medium therethrough.

10. An improved process of combusting solid fuel comprising the steps of:
   a) establishing and maintaining a fluidized bed of solid fuel within a vessel therefor and about a heat transfer means;
   b) pulse combusting a fuel-air mixture in a fashion to create a pulsating flow of combustion products therefrom;
   c) directing said pulsating combustion products flow to act directly on said fluidized bed of solid fuel for combustion of said solid fuel;
   d) circulating a heat transfer medium through said heat transfer means to receive heat therefrom for predetermined treatment of said medium; and
   e) exhausting products of combustion from said vessel after separation of entrained solids therefrom.

11. A process as defined in claim 10 wherein said fluidized solid fuel is coal and wherein said fuel for said pulse combustor is at least in part coal fines.

12. A process as defined in claim 11 wherein said coal has a high sulfur content and wherein a sorbent for sulfur is an admixture with said solid fuel.

13. A process as defined in claim 12 wherein said sorbent is limestone, and is present in a ratio of about two to about three times the amount of sulfur in the coal.

14. A process as defined in claim 10 wherein said pulsating combustion products flow produces an acoustic pressure wave is in a range of from about 100 to about 185 dB.

15. A process as defined in claim 10 wherein said pulse combustion produces a heat release in a range of from about $1 \times 10^6$ to about $10 \times 10^6$ Btu/hr/ft$^3$ and a product gas temperature in a range of from about 1400° to about 3500° F, and a gas velocity in a range of from about 150 to about 1600 feet per second.

16. A process as defined in claim 10 wherein gas for fluidizing said bed of solid fuel has a velocity in a range of from about 4 to about 13 feet per second.

* * * * *